Dec. 17, 1963  S. I. MacDUFF  3,114,580
BRAKE SYSTEM
Filed Feb. 9, 1961
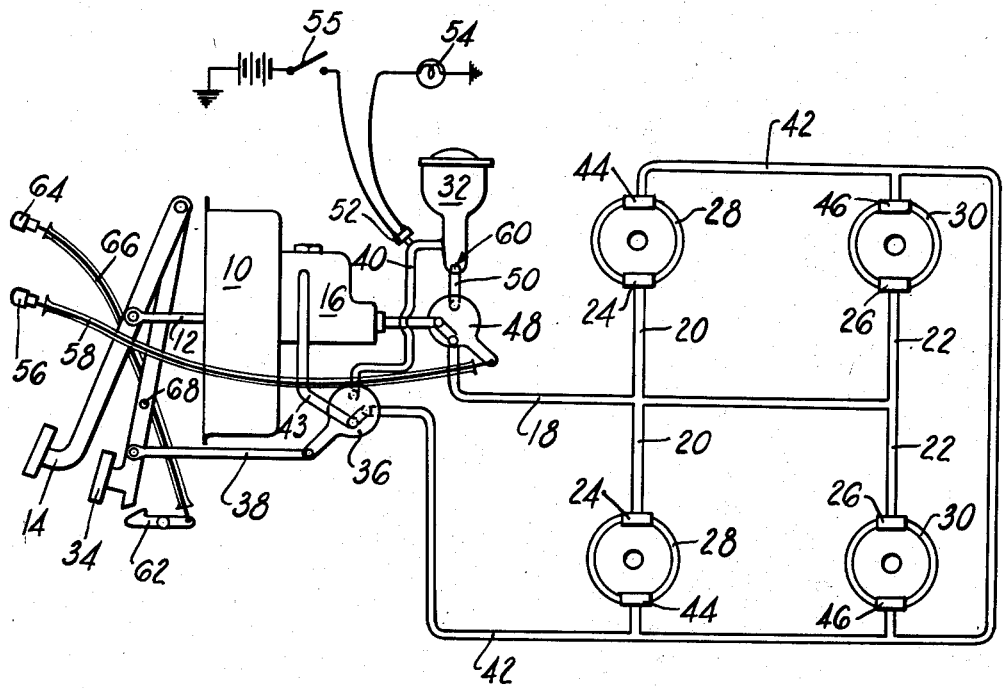
Fig. 1
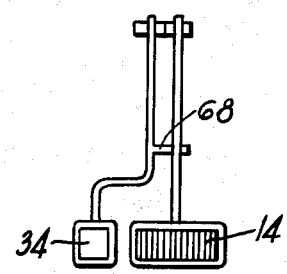
Fig. 2
Fig. 3
INVENTOR.
STANLEY I. MAC DUFF
BY
William N. Antonis
ATTORNEY United States Patent Office 3,114,580
Patented Dec. 17, 1963

3,114,580
BRAKE SYSTEM
Stanley I. MacDuff, South Bend, Ind., assignor to The Bendix Corporation, South Bend, Ind., a corporation of Delaware
Filed Feb. 9, 1961, Ser. No. 88,130
7 Claims. (Cl. 303—2)

This invention relates to brake systems and more particularly to a hydraulic emergency brake system for use in conjunction with a hydraulic service brake system.

An object of this invention is to provide an improved, simple fluid brake system for motor vehicles which assures greater reliability of the brake system.

Another object of this invention is to provide a dual hydraulic brake system wherein failure of a portion of the braking system will not impair braking.

A further object of this invention is to provide an auxiliary or emergency fluid brake system which will be automatically brought into use upon failure of any part of the equipment forming the conventional service brake apparatus.

A still further object of this invention is to provide an auxiliary brake system which not only serves as an emergency brake but also serves as an emergency brake but also serves as a parking brake.

Another object of this invention is to provide an auxiliary brake system which not only serves as an emergency brake but also serves as a parking brake.

Another object of this invention is to provide an auxiliary brake system which utilize a fluid pressure source other than the one utilized by the conventional service brake system and which utilizes conduits extending to each brake unit other than those which are utilized in connection with the conventional service brake system.

An important object of this invention is to provide means whereby use of the conventional service brake system will charge an accumulator used as a pressure source for the emergency brake system.

The above and other objects and features of the invention will become apparent from the following description taken in connection with the accompanying drawings which form a part of this specification and in which:

FIGURE 1 is a diagrammatic view of a brake system incorporating the invention;

FIGURE 2 is another view of the service and emergency brake foot pedal arrangement; and FIGURE 3 is a diagrammatic view of the auxiliary brake valve in a position communicating the auxiliary pressure source with the brake motors.

Shown diagrammatically in FIGURE 1 is a service brake system which includes a vacuum or other suitable booster 10 connected by an actuating rod 12 to a brake pedal 14. When the foot pedal 14 is depressed, a master cylinder 16 forces fluid under pressure through hydraulic fluid conduits 18, 20, and 22 to fluid pressure responsive brake motors 24 and 26. The brake motors 24 and 26 are associated with the front and rear axle brakes 28 and 30, respectively.

Such a service brake system has certain inherent difficulties, one of which is that failure of any of the motors 24 or 26, or the master cylinder 16, or any of the lines therebetween, will result in complete failure of the braking system due to loss of the fluid utilized to effect braking. Various approaches have been utilized to obviate these difficulties, the most reliable of which, perhaps, involves the use of a separate cylinder and piston for the front and rear wheels, respectively, so that upon failure in the brake motors or lines associated with one set of wheels, braking will still exist on the other set of wheels. Such a system, at best, in the event of failure, would provide only partial braking.

Accordingly, it is proposed to utilize an auxiliary braking system which will provide full braking when required and will function as a dual purpose emergency and parking brake system. The auxiliary system includes a hydro-pneumatic energy storage device 32, which may be of the type described in my U.S. Patent No. 2,893,433, a brake pedal 34, and a brake valve 36 suitably connected to the brake pedal by an actuating rod 38. A hydraulic fluid conduit 40 communicates accumulator 32 with the brake valve 36 and a hydraulic fluid conduit 42 communicates the brake valve with the fluid pressure responsive brake motors 44 and 46. The brake valve 36 is a three-way valve, which may be of the face or disc type, having a first position, as shown in FIGURE 1, for preventing flow of hydraulic fluid from the accumulator 32 to the brake motors 44 and 46 and a second position as shown in FIGURE 3 which is obtained upon depression of brake pedal 34. In the second position conduit 40 is communicated with conduit 42 so that pressurized fluid may flow from the accumulator to the brake motors.

In order to maintain the pressure in the accumulator at a predetermined value, a manually controllable charging valve 48 is placed in the hydraulic fluid line 18 of the service brake system so that hydraulic fluid may be passed from the master cylinder 16 to the accumulator 32 via line 50, as desired. The charging valve may also be a three-way face type valve which normally has a first position, as shown in FIGURE 1, for permitting displacement of hydraulic fluid from the master cylinder 16 to the brake motors 24 and 26 via conduit 18 and a second position for permitting flow of hydraulic fluid from the master cylinder to the accumulator 32 via conduit 50. In order to provide means for indicating when the pressure in the accumulator falls below a predetermined value, a switch 52 is provided which closes a circuit at the predetermined low limit of pressure, and warns the vehicle operator through a signal light 54 that pressure fluid should be added to the accumulator. The operator will then pull knob 56, thereby positioning charging valve 48, through Bowden wire 58, so that master cylinder 16 communicates with the accumulator. Several strokes of the master cylinder by means of service pedal 14 will charge the accumulator through check valve 60 and raise the accumulator pressure to the predetermined value. When this value is reached, the switch 52 opens and the signal light goes off. The operator will release knob 56 and the charging valve 48 will be returned to its normal service brake position by a spring (not shown.) It will be noted that the signal light 54 operates only when the ignition switch 55 is closed.

When the car is parked, the auxiliary system may be used as a parking brake, by depressing auxiliary brake pedal 34. This causes the brake valve 36 to move to a position which will permit passage of hydraulic fluid from the accumulator 32 to the brake motors 44 and 46. A latch 62, which is releasable through knob 64 and Bowden wire 66, retains pedal 34 in its depressed position so that the accumulator pressure will cause a continuous braking action. Expansion and contraction of the fluid in the brake mechanism and any leakage is continuously compensated for by flow in or out of the accumulator with negligible effect on the pressure. Release of the latch 62 will permit spring return of the brake valve 36 to the illustrated position, thereby permitting pressure fluid to flow from the auxiliary brake wheel cylinders back to the reservoir of master cylinder 16 through conduits 42 and 43.

Normally, the service brake pedal 14 is movable in a first range when the service brake system is in order and will not cause actuation of the auxiliary brake system. However, upon failure of the service brake system the brake pedal 14 will move into a second range wherein it will engage a projection 68, extending from auxiliary brake pedal 34 (as shown in FIGURE 2). Upon contact with the projection 68, any further movement of service brake pedal 14 will cause concomitant movement of the auxiliary brake pedal 34, and will result in actuation of the auxiliary brake system. Means (not shown) should be provided for rendering the latch 62 inoperative under this condition so that the driver can release the brakes by raising pedal 14.

The several practical advantages which flow from this brake system are believed to be obvious from the above, and other advantages may suggest themselves to those who are familiar with the art to which this invention relates.

Having thus described the various features of the invention, what I claim as new and desire to secure by Letters Patent is:

1. In a fluid pressure braking system, separate conduit and motor means constituting service and emergency braking systems, a fluid pressure producing device for normally actuating said service braking system, a fluid pressure storage device, means for permitting charging of the pressure storage device by operation of the pressure producing device, and valve means for actuating said emergency braking system by fluid under pressure from said pressure storage device upon failure of said service braking system.

2. In a fluid pressure braking system for a vehicle, separate conduit and motor means constituting service and emergency braking systems, a fluid pressure producing device for normally actuating said service braking system, a fluid pressure storage device, first valve means for permitting charging of the pressure storage device by operation of the pressure producing device, and second valve means for actuating said emergency braking system by fluid under pressure from said pressure storage device upon failure of said service braking system, said second valve means being actuable to apply pressure to the emergency braking system for the purpose of parking the vehicle.

3. In a fluid pressure braking system, separate conduit and motor means constituting service and emergency braking systems, a fluid pressure producing device for normally actuating said service braking system, a fluid pressure storage device, first valve means for permitting charging of the pressure storage device by operation of the pressure producing device, second valve means for actuating said emergency braking system by fluid under pressure from said pressure storage device upon failure of said service braking system, and indicating means responsive to pressure in said pressure storage means for indicating predetermined pressure conditions therein.

4. In a fluid pressure braking system for a vehicle, separate conduit and motor means constituting service and emergency braking systems, a fluid pressure producing device for normally actuating said service braking system, a fluid pressure storage device, first valve means for permitting charging of the pressure storage device by operation of the pressure producing device, second valve means for actuating said emergency braking system by fluid under pressure from said pressure storage device upon failure of said service braking system, and second valve means being actuable to apply pressure to the emergency braking system for the purpose of parking the vehicle, and indicating means responsive to pressure in said pressure storage means for indicating predetermined pressure conditions therein.

5. In a fluid pressure braking system, a fluid pressure producing device and a fluid pressure storage device, separate conduit and motor means constituting two systems for actuating the brakes, first valve means for selectively connecting the pressure producing device to the pressure storage device or to one of the conduit and motor means, and second valve means for connecting the pressure storage device to the second conduit and motor means.

6. In combination with a service brake system having brake applying motor means, conduit means, hydraulic means for normally displacing hydraulic fluid to said brake applying motor means via said conduit means, and means including a first brake pedal for actuating said hydraulic means, a dual purpose emergency and parking brake system comprising auxiliary conduit means, a hydro-pneumatic energy storage device for automatically displacing hydraulic fluid to said brake applying motor means via said auxiliary conduit means upon failure of said service brake system, auxiliary means including a second brake pedal for actuating said hydro-pneumatic energy storage device, passage means for communicating said hydraulic means with said hydro-pneumatic energy storage device, and valve means located in said passage means for permitting flow of hydraulic fluid from said hydraulic means to said hydro-pneumatic energy storage device to thereby maintain the pressure in said device at a predetermined value, said first brake pedal being movable in a first range when said hydraulic means is in working order and being movable in a second range upon failure of said hydraulic means, said second range movement causing positive contact with and concomitant movement of said second brake pedal.

7. In a fluid pressure operated system having motor means, conduit means, pressure producing means for normally displacing fluid to said motor means via said conduit means, and means including a first actuating member for controlling said pressure producing means, an auxiliary fluid system comprising auxiliary conduit means, pressure storage means for automatically displacing fluid to said motor means via said auxiliary conduit means upon failure of said pressure producing means to displace fluid to said motor means via said first mentioned conduit means, means including a second actuating member for controlling said pressure storage means, passage means for communicating said pressure producing means with said pressure storage means, and valve means operatively connected to said passage means for permitting flow of fluid from said pressure producing means to said pressure storage means to thereby maintain the pressure in said pressure storage means at a predetermined value, said first actuating member being movable in a first range when said pressure producing means is in working order and being movable in a second range upon failure of said pressure producing means, said second range movement causing positive contact with and concomitant movement of said second actuating member.

References Cited in the file of this patent
UNITED STATES PATENTS

| | | |
|---|---|---|
| 1,885,580 | Bradbury | Nov. 1, 1932 |
| 2,322,062 | Schnell | June 15, 1943 |
| 2,343,809 | Schnell | Mar. 7, 1944 |
| 2,402,115 | Levy | June 11, 1946 |
| 2,595,248 | Greer et al. | May 6, 1952 |

FOREIGN PATENTS

| | | |
|---|---|---|
| 627,595 | Great Britain | Aug. 11, 1949 |

UNITED STATES PATENT OFFICE
CERTIFICATE OF CORRECTION

Patent No. 3,114,580                          December 17, 1963

Stanley I. MacDuff

It is hereby certified that error appears in the above numbered patent requiring correction and that the said Letters Patent should read as corrected below.

Column 1, lines 23 to 26, strike out "A still further object of this invention is to provide an auxiliary brake system which not only serves as an emergency brake but also serves as an energency brake but also serves as a parking brake."; same column 1, line 27, for "Another" read -- A still further --; line 31, for "utilized" read -- utilizes --.

Signed and sealed this 9th day of June 1964.

(SEAL)
Attest:

ERNEST W. SWIDER                              EDWARD J. BRENNER
Attesting Officer                                   Commissioner of Patents